April 8, 1952  E. LUBATTI  2,591,709

FURNACE ELECTRODE

Filed April 12, 1949

INVENTOR:
EUGENIO LUBATTI

Patented Apr. 8, 1952

2,591,709

UNITED STATES PATENT OFFICE 2,591,709

FURNACE ELECTRODE

Eugenio Lubatti, Turin, Italy

Application April 12, 1949, Serial No. 87,018
In Italy April 17, 1948

1 Claim. (Cl. 13—18)

This invention relates to a new electrode made of graphite or other carbonaceous material, to be employed in metal or other melting furnaces.

In comparison with the different types of conventional electrodes used at the present time in melting furnaces and their way of application, substantial improvements are introduced according to the present invention.

A quite particular feature of the electrode according to the invention consists in separating the two functions of carrying the current from the outside to the furnace, and of transmitting heat to the bath, this result being obtained by reducing the very electrode merely to a head which reaches a high temperature, said head being supported and supplied with electric current by a hollow arm of reduced cross-section which is kept at a relatively low temperature throughout its whole length.

In such a way, owing to the reduced size in height of the graphite electrode, it is possible to dip the same fully into the melted slag thus preserving it from air contact and thereby avoiding its decomposition and wear. Moreover, the arm which supports the submerged head of the electrode does not require large openings in the furnace wall to project therethrough, thus reducing any heat losses, and lastly the electrode can be carried by comparatively light supports provided with suitable means to control its movement, thereby avoiding complicated and bulky structures for supporting the electrodes.

Practical experiments show that the electric current is uniformly distributed on the whole surface of the electrode when passing from the same to the bath, so that the electric current density (that is the number of ampere for each sq. centim.) can be limited to values which are lower than the values at which exceedingly high localised temperatures are produced with the consequence of the disintegration of the electrode itself.

The behaviour of the electrode surface depends upon the coupling of the supporting arm with the electrode, every point of its surface being substantially equidistant from its support and in any position of said electrode each point of the electrode being—as a consequence—cooled at the same rate by this coupling.

Another feature of this electrode is a special lining of the supporting arm adapted to withstand any sudden change in temperature as well as any corrosion from the slag, the lining being made of insulating substances which reduce the heat transfer from the furnace to a part of the cooled arm and prevent the current from passing directly from the arm to the slag bath, compelling it to pass through the head of the electrode.

Other features concern specifically a furnace suitable to take advantage of the particulars of the free hanging electrode, the furnace preferably consisting of a basin or of a crucible made of a refractory and electrically insulating material, in which the melting of the substance (in ingots or in pieces when working for instance, with scrap material) takes place, utilising the electric resistance of the material itself as well as the slag to generate heat by Joule effect. An essential feature of such furnace results from the possibility of furnishing the required heat without the production of any arc or remarkable local overheating, the warm region being kept at a relatively even temperature which is, in a certain way, limited under the liquid surface of the slag.

There follows a regular proceeding of the melting and less heat dispersion to the outside, owing to the fact that the furnace vault is not exposed to big radiations and may be built with a refractory insulating material.

Further, the features of the new electrode are such as to permit working of the electrode at relatively low temperatures as compared with the temperature of the metal bath to be heated, which necessitates an essential solution of the problem.

For a better understanding of the invention, one of its preferred embodiments is given, by way of a simple example, in the annexed drawing.

Figure 1:
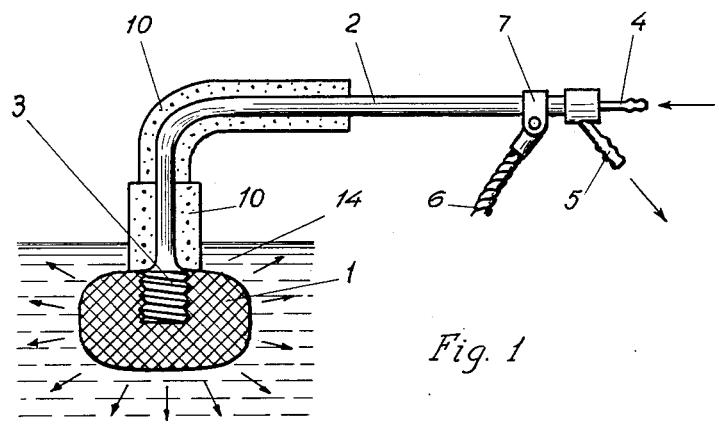
Fig. 1 is a view of the electrode, partially in section.

In the drawings 1 is the graphite head which has preferably a cylindrical shape and is submerged in the slag bath 14; 2 is the electrode carrying or supporting rod which, in this embodiment is formed of a metal tube closed at the far end thereof and connected by means of an enlarged end 3 to and is embedded in the head 1, the tubular support being cooled inside thereof by means of a cooling fluid, generally water, entering through the central pipe 4 and leaving at the end of the latter a certain distance from the closed end of tubular support 2 into chamber 9 (positioned within the electrode 1) and thence through the exhaust pipe 5 communicating with the tubular support 2. The electric current is transmitted to the support of arm 2 by means of the cable 6 which is clamped or fastened to a collar 7 on tubular arm 2.

Figure 2:
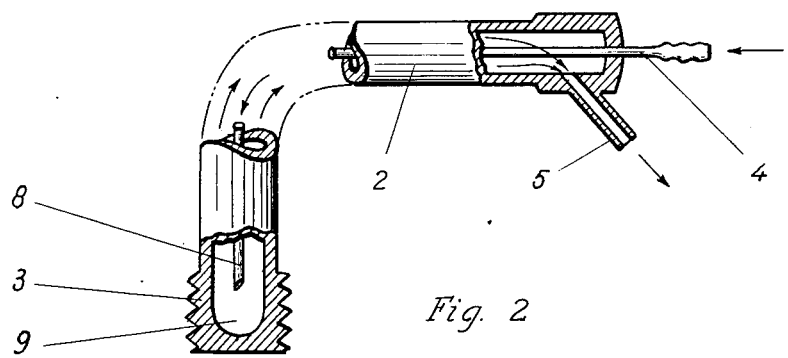
Fig. 2 shows on enlarged scale some details relating to the end of the electrode supporting-arm, partially in section

With special reference to Fig. 2 it is evident in which manner cooling of the joint 3 between the arm and the head 1 takes place. The fluid which comes out from the end 8 of the pipe 4, after the contact with the bottom wall of hollow chamber 9, goes back through the arm to be discharged through outlet pipe 5, thus cooling the whole length of the electrode bearing arm. In the area in contact with the slag 14, the arm 2 is protected by means of a special lining or covering 10 (shown in section in Fig. 1). Said covering can be made of a conglomerate of asbestos fibres with other dielectric and thermoinsulating refractory substances bound together by means of wire embedded in the mass.

Figure 3:
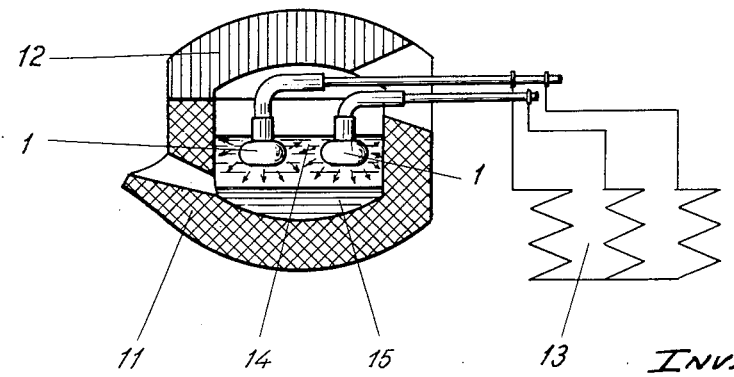
Fig. 3 represents a diagrammatic section of the furnace.

Finally, according to Fig. 3, 11 is the refractory basin of the furnace, and 12 the insulating refractory vault. The electrodes 1—for instance three—carry the electric current coming from the transformer 13 to the slag bath 14 and to the metal 15 to be melted (or molten).

The invention has been illustrated and specified in a preferred embodiment, but obviously many changes in the constructive details may be introduced without exceeding the scope of this invention.

Having thus fully described the present invention and in what manner the same is to be performed, what I claim is:

An electrode for use in connection with electric melting furnaces, comprising a hollow metal conductor having a substantially horizontal portion and a substantially vertical, depending portion joined to said substantially horizontal portion by a bend, a head of carbonaceous material secured to the lower end of said depending portion, an insulating jacket including a mixture of asbestos fibers and refractory substance bound together with wire reinforcement, said jacket abutting against said head and extending therefrom to enclose said depending portion, said bend and part of said substantially horizontal portion, and conduit means extending through both of said portions of said hollow conductor thereinto and spaced from said lower end to enable circulation of a cooling fluid through said conduit means and through said hollow metal conductor.

EUGENIO LUBATTI.

REFERENCES CITED

The following references are of record in the file of this patent:

UNITED STATES PATENTS

| Number | Name | Date |
| --- | --- | --- |
| 582,721 | Deuther | May 18, 1897 |
| 717,009 | Lougee | Dec. 30, 1902 |
| 809,312 | Lougee | Jan. 9, 1906 |
| 896,429 | Becket | Aug. 18, 1908 |
| 1,315,992 | Sejournet | Sept. 16, 1919 |
| 1,440,724 | Soderberg | Jan. 2, 1923 |
| 1,542,716 | Payne | June 16, 1925 |
| 1,741,469 | Long | Dec. 31, 1929 |
| 1,757,695 | Westly | May 6, 1930 |
| 1,880,540 | Wadman | Oct. 4, 1932 |
| 2,093,411 | Bowden et al. | Sept. 21, 1937 |
| 2,234,476 | Jessop | Mar. 11, 1941 |
| 2,349,678 | Rolnick | May 23, 1944 |
| 2,471,531 | McIntyre et al. | May 31, 1949 |

FOREIGN PATENTS

| Number | Country | Date |
| --- | --- | --- |
| 13,241 | Switzerland | Oct. 13, 1896 |
| 220,266 | Switzerland | June 16, 1942 |
| 888,470 | France | Sept. 16, 1943 |